US012164614B2

United States Patent
Manuel-Devadoss (10) Patent No.: US 12,164,614 B2
(45) Date of Patent: Dec. 10, 2024

(54) BIOMETRIC BASED ACCESS CONTROL FOR DAAS

(71) Applicant: ORACLE INTERNATIONAL CORPORATION, Redwood Shores, CA (US)

(72) Inventor: Johnson Manuel-Devadoss, San Antonio, TX (US)

(73) Assignee: Oracle International Corporation, Redwood Shores, CA (US)

( * ) Notice: Subject to any disclaimer, the term of this patent is extended or adjusted under 35 U.S.C. 154(b) by 220 days.

(21) Appl. No.: 17/730,447

(22) Filed: Apr. 27, 2022

(65) Prior Publication Data
US 2023/0350990 A1  Nov. 2, 2023

(51) Int. Cl.
G06F 21/32 (2013.01)
G06F 9/451 (2018.01)
G06F 9/455 (2018.01)
H04L 9/32 (2006.01)

(52) U.S. Cl.
CPC .............. *G06F 21/32* (2013.01); *G06F 9/452* (2018.02); *G06F 9/45533* (2013.01); *H04L 9/32* (2013.01); *H04L 9/3231* (2013.01); *G06F 2009/45562* (2013.01); *G06F 2009/45595* (2013.01)

(58) Field of Classification Search
CPC ...... G06F 21/32; G06F 9/452; G06F 9/45533; G06F 2009/45562; G06F 2009/45595; H04L 9/32; H04L 9/3231
See application file for complete search history.

(56) References Cited

U.S. PATENT DOCUMENTS

| | | | |
|---|---|---|---|
| 6,731,731 B1 | 5/2004 | Ueshima | |
| 10,693,872 B1 | 6/2020 | Larson | |
| 2014/0118108 A1* | 5/2014 | Kramer | G06F 1/26 340/5.52 |
| 2015/0222622 A1 | 8/2015 | Lowe | |
| 2016/0342784 A1* | 11/2016 | Beveridge | G06F 21/34 |
| 2017/0372122 A1* | 12/2017 | Shim | H04W 12/065 |
| 2018/0167394 A1 | 6/2018 | High et al. | |

(Continued)

OTHER PUBLICATIONS

Non-Final Office Action from U.S. Appl. No. 17/382,720, filed Jul. 22, 2021, having a date of mailing of Oct. 27, 2022, 21 pgs.
Final Office Action from U.S. Appl. No. 17/382,720, filed Jul. 22, 2021, having a date of mailing of Mar. 22, 2023, 15 pgs.

(Continued)

*Primary Examiner* — Cheng-Feng Huang
(74) *Attorney, Agent, or Firm* — Kraguljac Law Group, LLC (57) ABSTRACT

Systems, methods, and other embodiments associated with configuring and controlling access to virtual desktops are described. In one embodiment, a method includes configuring a virtual desktop for a registered user, wherein the virtual desktop includes at least allocated virtual computing devices and is accessible by a desktop as a service (DaaS). Biometric access credentials are assigned to the virtual desktop for obtaining remote access to the virtual desktop, wherein the biometric access credentials are based at least in part on registered biometric data that was collected from and specific to the registered user. Access to the virtual desktop is controlled by a server based on biometric authentication that grants or prohibits access to the virtual desktop based on a user's biometric data.

20 Claims, 4 Drawing Sheets

(56) References Cited

U.S. PATENT DOCUMENTS

| | | |
|---|---|---|
| 2018/0276450 A1 | 9/2018 | Rakshit et al. |
| 2019/0312731 A1 | 10/2019 | Eldefrawy et al. |
| 2019/0312863 A1 | 10/2019 | Chow et al. |
| 2019/0370479 A1 | 12/2019 | Uhr et al. |
| 2020/0007333 A1 | 1/2020 | Young et al. |
| 2020/0067907 A1 | 2/2020 | Avetisov et al. |
| 2020/0145219 A1 | 5/2020 | Sebastian et al. |
| 2020/0334685 A1 | 10/2020 | Yan |
| 2020/0389526 A1 | 12/2020 | Singleton, IV et al. |
| 2020/0412541 A1 | 12/2020 | Yang et al. |
| 2021/0058470 A1 | 2/2021 | Singleton, IV et al. |
| 2021/0152365 A1 | 5/2021 | Nosseir et al. |
| 2021/0295320 A1 | 9/2021 | Yan |
| 2021/0326432 A1 | 10/2021 | Kaidi |
| 2021/0350010 A1 | 11/2021 | Schvey et al. |
| 2022/0156387 A1* | 5/2022 | Keller .................. G06F 21/554 |
| 2022/0237274 A1* | 7/2022 | Paul ........................ G06F 21/32 |
| 2022/0253516 A1 | 8/2022 | Chung |

OTHER PUBLICATIONS

Patent Cooperation Treaty (PCT) International Search Report and Written Opinion issued in PCT International Application No. PCT/US2022/031721, having a date of mailing of Sep. 8, 2022 (16 pgs).

Jang et al.; Biometric-PKI Authentication System Using Fingerprint Minutiae; Journal of Computer and Communications, 2014, 2, 25-30; pp. 1-6; Published Online Mar. 2014 in SciRes. http://www.scirp.org/journal/jcchttp://dx.doi.org/10.4236/jcc.2014.24004.

Temoshok et al.; Developing Trust Frameworks to Support Identity Federations; National Institute of Standards and Technology—U.S. Dept. of Commerce (NISTIR 8149) Jan. 2018; pp. 1-34; available at: https://doi.org/10.6028/NIST.IR.8149.

Corestreet, Ltd.; Introduction to Validation for Federated PKI; pp. 1-21; Copyright 2006; downloaded from: https://corestreet.com/about/library/whitepapers/w06-03v2a%20-%20federated-pki.pdf.

Non-Final Office Action from U.S. Appl. No. 17/382,720, filed Jul. 22, 2021, having a date of mailing of Sep. 16, 2023, 21 pgs.

USPTO Notice of Allowance from U.S. Appl. No. 17/382,720, filed Jul. 22, 2021, having a date of mailing of Feb. 21, 2024, 21 pgs.

* cited by examiner

FIG. 4

BIOMETRIC BASED ACCESS CONTROL FOR DAAS

BACKGROUND

In today's digital world, an average person has multiple electronic devices which are used for work and personal use. Often people are forced to carry portable computing devices to and from work, which can result in a high risk of losing company assets, losing confidential and proprietary information, and losing data. In addition, if a user forgets or loses their domain account credentials, then the user cannot access their own computing device information whether locally or from a server. Losing or forgetting passwords has been a growing problem due to each user having dozens or hundreds of online accounts and each account requiring more complex passwords. Such complex password requirements mostly serve to block the authorized user out of their own accounts.

Some remote solutions assign a specific desktop computing device that is linked to an account. Thus, access to the remote solution is restricted to the specific desktop. A desktop computer, due to its size, is typically not transported between locations and thus has a low risk of being lost or stolen. However, desktop computing devices occupy more space, utilize more energy, and require additional maintenance as compared to portable devices. Thus, portable devices are more frequently used and users again experience difficulties in accessing their remote solutions.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that facilitate and control access to virtual computing devices for a user based on biometric authentication. In one embodiment, a virtual desktop may be created that includes one or more virtual computing devices allocated as part of a desktop as a service (DaaS) that is configured for and/or assigned to a registered user. The registered user may utilize any remote device (e.g., smart device, laptop, etc.) to access their virtual computing devices from the cloud by providing their biometric credentials. Thus, access is not restricted to being requested from a specific remote device, such as a designated laptop/desktop that is assigned to the user's virtual desktop via DaaS. Access is also not restricted to requiring the user to remember or use a complex password for security.

Previous techniques to access a virtual desktop using DaaS required the user to have a dedicated machine, install a client application, and configure the dedicated machine to access the user's DaaS. Access was not permitted from any other machine or device except the dedicated machine.

The present innovative approach allows users to access their DaaS and cloud-hosted information in a secure manner from any place or at any time with biometric authentication, for example, using a finger imprint or a retinal scan. The cloud-based information, regardless of which device stores the information, can be accessible to the user to avoid problems of having to manually transfer data to different local devices. These devices would communicate in real time.

In one embodiment, the present system and method implement a control mechanism to virtual desktops (DaaS) that provides shared processing resources and data to remote computers based on a user's biometric coordinates.

Figure 1:
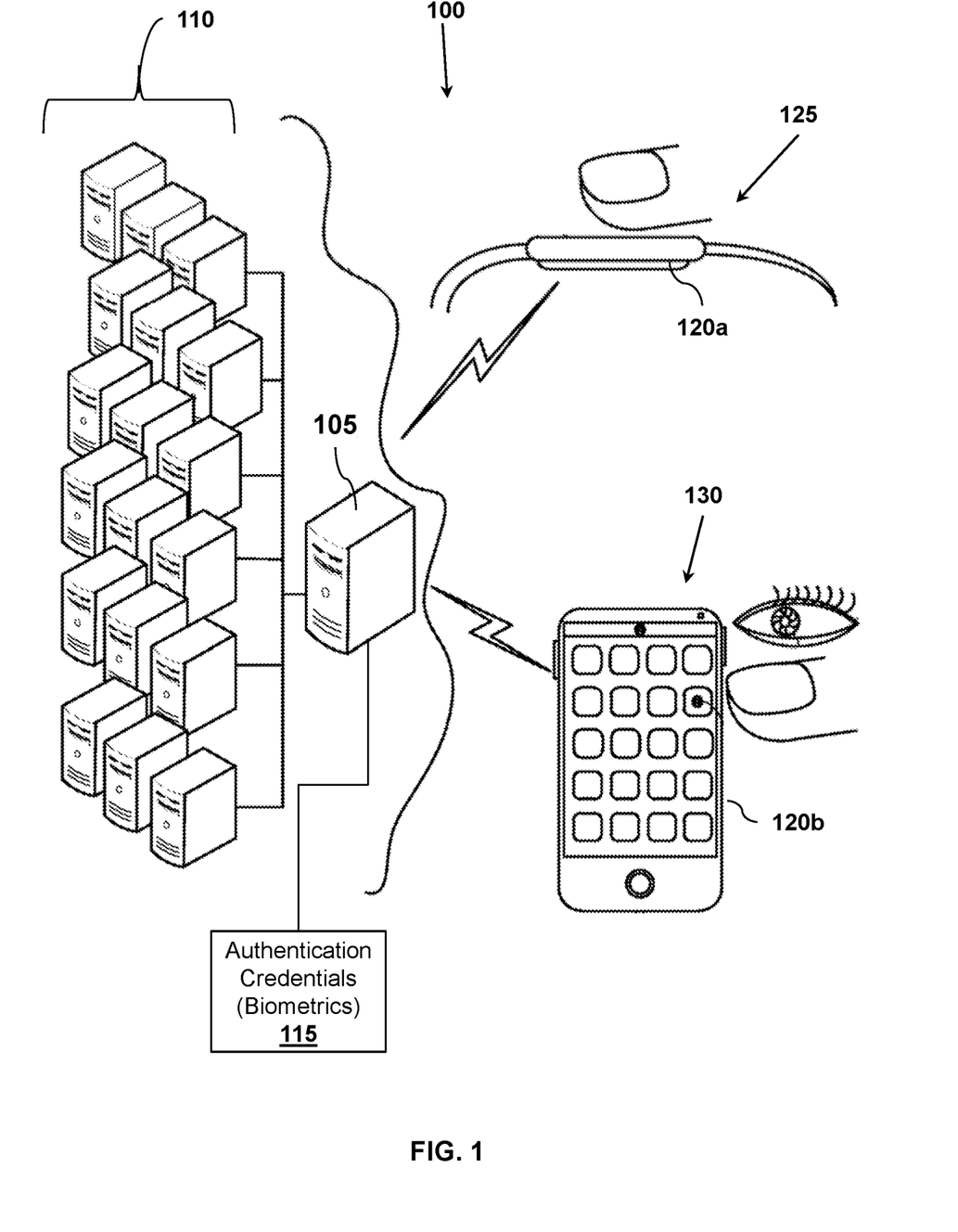
FIG. 1 illustrates one embodiment of a system associated with controlling remote access to virtual desktops based on user biometric data.

With reference to FIG. 1, one embodiment of an access control system 100 is illustrated that associated with facilitating and controlling access to virtual computing devices for a user based on biometric authentication. The access control system 100 may include a master server 105 configured to control remote access to virtual computing devices 110. In one embodiment, the virtual computing devices 110 are allocated to cloud-hosted virtual desktops where a virtual desktop is created and assigned to a registered user (e.g., a defined account or user).

A virtual desktop assigned to a registered user includes corresponding registered biometric data that was collected from the registered user as part of its biometric authentication credentials 115. The biometric authentication credentials 115 are used to control access the virtual desktop. Thus, in one embodiment, the system 100 configures the virtual desktop to be accessed by biometric authentication based on an access request providing biometric data that matches the registered biometric data. The biometric data (e.g., biometric access credentials 115) collected from each registered user may be contained in a biometric data repository and associated with the corresponding user account. In another embodiment, other access credentials may be included in addition to the biometric access credentials.

In this manner, the virtual desktop and/or the DaaS are not restricted to be accessed from a specified remote device. The master server 105 controls access to the virtual desktop/DaaS based on the biometric access credentials 115 and thus allows an access request to originate from any remote device. In other words, an access request is not rejected simply by not originating from a specified remote device.

In one embodiment, the master server 105 is configured to receive and process access requests from one or more access applications 120 (e.g., 120*a*, 120*b* . . . 120*n*). Each access application 120 is installed and operates on a remote computing device such as a smart watch 125, a smart device 130, laptop, etc. The access application may be implemented as part of a user interface for accessing a virtual desktop from the associated remote device.

The master server 105 is configured to authenticate and/or validate each access request to determine whether the access request is granted or denied. The authentication and/or validation is based at least on user biometric data that is collected by an access application 120 from a user and transmitted with the access request.

In one embodiment, the master server 105 is configured to control access to virtual desktops (DaaS) by: establishing remote access between a remote device and the virtual computing devices of the DaaS in response to an access request that includes biometric data that matches registered biometric data assigned to the virtual desktop/DaaS. The master server 105 prohibits access to the virtual desktop/DaaS in response to the access request failing to match the registered biometric data assigned to the virtual desktop/DaaS.

In one embodiment, the user biometric data may include one type of biometric data or combinations of finger coordinates, retinal coordinates, facial coordinates, and/or other biometric information from a user. By controlling remote access to virtual desktops based on user biometric data, a user may access a virtual desktop from any remote device, and without remembering a complex password. In another embodiment, the present system may be used in combination with a non-biometric credential such as a username, simple password, security question, etc.

In one embodiment, the virtual desktops (created with one or more of the virtual computing machines 110) are cloud-hosted and provided by a cloud computing system. The virtual desktops may be implemented by a Desktop as a Service (DaaS) model. For example, the DaaS is configured to provide virtual desktops and virtual applications from the cloud to a remote device in a secure manner.

Figure 2:
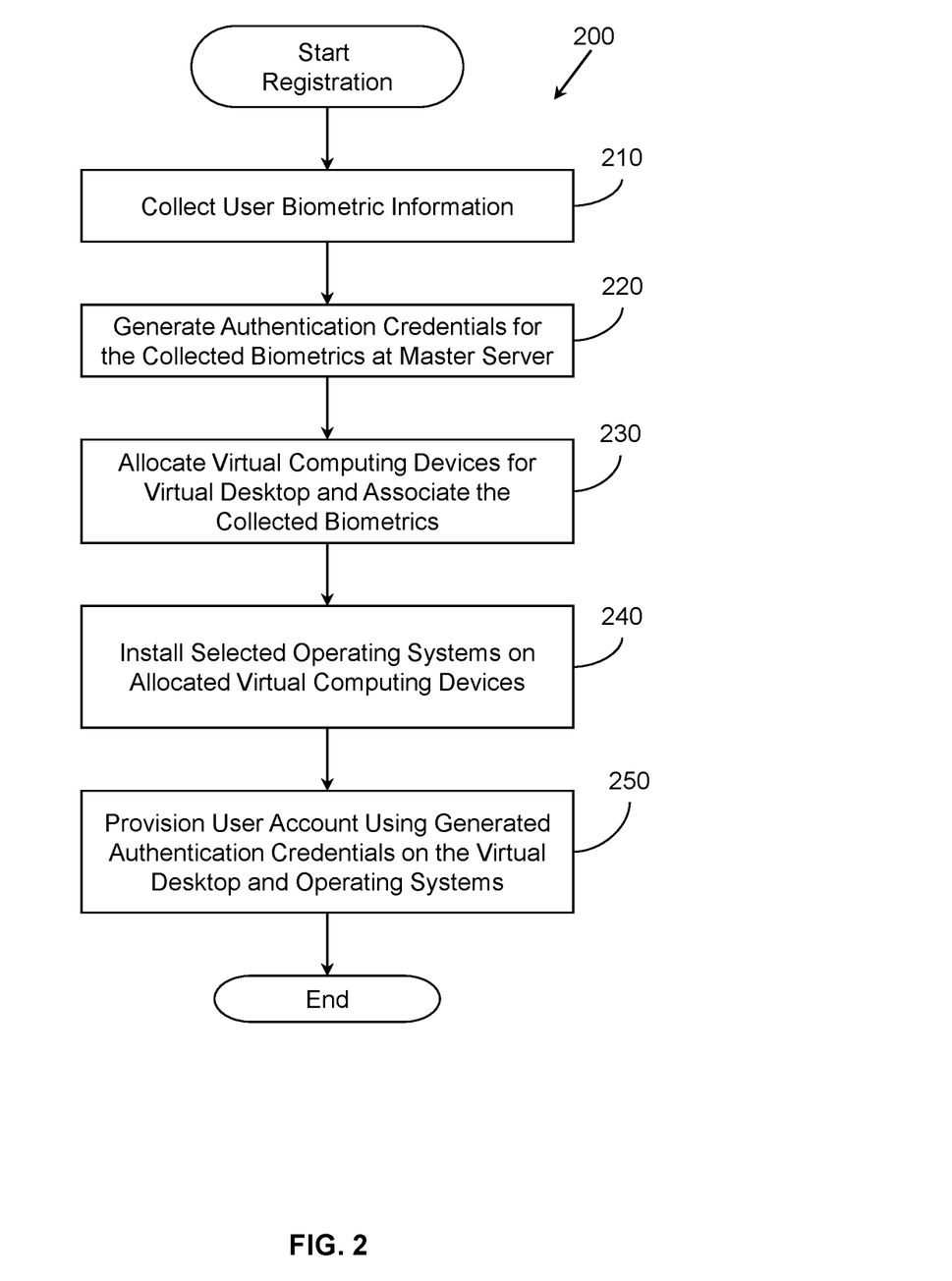
FIG. 2 illustrates one embodiment of a method associated with creating a virtual desktop based on user biometric data.

With reference to FIG. 2, one embodiment is illustrated of a method 200 associated with creating and configuring a virtual desktop and/or virtual computing devices for a registered user and using the user's biometric data as part of authentication credentials. As used here, a "registered user" refers to a user that is known to the system and is an authorized user for a particular virtual desktop/virtual computing device.

The functions shown in method 200 are not limited to the illustrated sequential order. The functions may be performed in different sequences and/or concurrently with other functions described herein. In another embodiment, the virtual desktop may have been previously created and associated to a registered user. Method 200 may then be performed to reconfigure the existing authentication credentials associated to the virtual desktop to be based on the registered user's biometric data.

In one embodiment, an overview may be described with the following functions. A desktop as a service (DaaS) is configured for a registered user, where the DaaS includes at least allocated virtual computing devices and one or more operating systems installed on the allocated virtual computing devices. The system assigns biometric access credentials to the DaaS for controlling and obtaining remote access to the DaaS. The biometric access credentials are based on registered biometric data that was collected from and specific to the registered user. Thus, the registered user has unique biometric-based access credentials that are generated from their biometric data. Access to their virtual desk is then controlled by providing their unique biometric-based access credentials. A more detailed description is provided as follows, in another embodiment.

At block 210, biometric information is collected from a user for the purpose of registering with the present system 100 (FIG. 1). In one embodiment, a computing device equipped with input devices capable of observing a user's biometric features may be used to collect the biometric information. The input devices may be integrated with the computing device or may be externally connected to the computing device. The input devices may include, for example, a camera, a fingerprint scanner, a retinal scanner, a camera configured to take retinal images, or other sensing device, altogether referred to herein as biometric input devices. Many smart computing devices, such as smart phones, include cameras and include a fingerprint scanner built into the home button.

In one embodiment, the computing device may include a client component/application (or may be obtained by downloading) for registering with the master server 105 (FIG. 1) for access to a virtual desktop DaaS. The client component communicates with one or more of the biometric input devices to collect the user's biometric information. This may include collecting imprints of one or more thumbs and/or fingers biometric data or templates (e.g., minutiae, ridge flow, etc.) and/or eye retinal biometric data or templates (e.g., cornea, iris, etc.). The collected biometric data may be converted into digital biometric data that represents unique numerical data points of the collected data. The client component may then transmit the collected biometric data (digital biometric data) to the master server in an encrypted form or otherwise secure manner.

In one embodiment, the client component/application may include a mobile application that may be offered by an app store and downloadable to a user computing device such as a mobile device equipped with biometric input devices. A user may be added and registered to the present system 100 in an initial registration operation using the mobile application. For example, the system 100 may request the user to provide their thumbprint, fingerprint, and/or eye retinal scan coordinates using the mobile application. The mobile application is configured to register the user's identity after the user places a thumb and/or finger on the fingerprint scanner and/or placing an eye in front of a retinal scanner or camera. The mobile application receives and transmits the collected biometric data to the master server 105.

At block 220, the master server 105 (FIG. 1) generates authentication credentials for the user based on the collected biometric data. Since the collected biometric data is unique to the user, the authentication credentials are thus unique to the user. In one embodiment, the authentication credentials may be based on any portion or combinations of the collected biometric data, for example, using one or more scanned imprints of finger biometric data or templates (e.g., minutiae, ridge flow, etc.), and/or using eye retinal coordinates.

Some collected biometric data may only include one type of biometric data since the client device may have only one type of biometric input device. Some collected biometric data may include multiple types including finger coordinates, retinal coordinates, and/or facial coordinates. In one embodiment, the collected biometric data may be stored in a biometric data repository and associated to a corresponding registered user and/or account.

In one embodiment, the master server 105 generates the authentication credentials as a unique ID from the collected biometric data. The master server 105 may then use the unique ID to allocate and provision virtual devices and applications to the user's virtual desktop, as will be described in the following portions of FIG. 2.

At block 230, a virtual desktop is defined on the system for the registered user. One or more virtual computing devices are allocated to the virtual desktop that is associated/assigned to the registered user. The authentication credentials that were generated based on the biometric data of the registered user is assigned or associated with the virtual desktop. The biometric-based authorization credentials will be used to control access to the virtual desktop.

At block 240, selected operating systems may be installed on the allocated virtual computing devices. The type of operating system(s) may be selected by the user and/or be default types based on a desired computing environment/platform for the virtual desktop. Other types of virtual applications may also be allocated/installed for the virtual desktop. In one embodiment, while provisioning an operating system on a virtual computing device, the master server 105 may provide the generated unique ID (biometric-based authentication credentials) to create a user account on each operating system.

At block 250, the system 100 provisions a user account for the registered user using the generated biometric-based authentication credentials that are unique to the registered user. The user account is associated with the virtual desktop and installed operating system(s) as defined for the registered user. In one embodiment, the virtual desktop is configured to be provided as a desktop as a service (DaaS). The virtual desktop may then be accessed remotely by the registered user by providing biometric data that matches the registered biometric data (authentication credentials) associated with the virtual desktop.

In another embodiment, as previously mentioned, the generated biometric-based authentication credentials may be applied to an existing user account and/or existing virtual desktop that uses non-biometric-based authentication credentials. The non-biometric-based authentication credentials are non-biometric data, for example, username, password, security code, phone number, email, and/or other non-biometric data, etc.). To reconfigure existing credentials, the master server may be configured to identify and select an existing virtual desktop associated with a user account that is configured with non-biometric-based authentication credentials. The existing virtual desktop is then reconfigured with biometric-based authentication credentials.

For example, the non-biometric-based authentication credentials may be replaced or combined with registered biometric data (biometric-based authentication credentials) that was collected from the associated user, as described above. Access to the existing virtual desktop may then be controlled using biometric data from the associated user as biometric-based authentication credentials. Thus, the associated user may access the existing virtual desktop from any remote device by providing their biometric data with an access request using the present system. In another embodiment, the present system may be configured to control access by combining one or more of the previously established non-biometric-based authentication credentials with the biometric-based authentication credentials. For example, access is granted to a virtual desktop by receiving an authorized username and associated matching biometric data.

Figure 3:
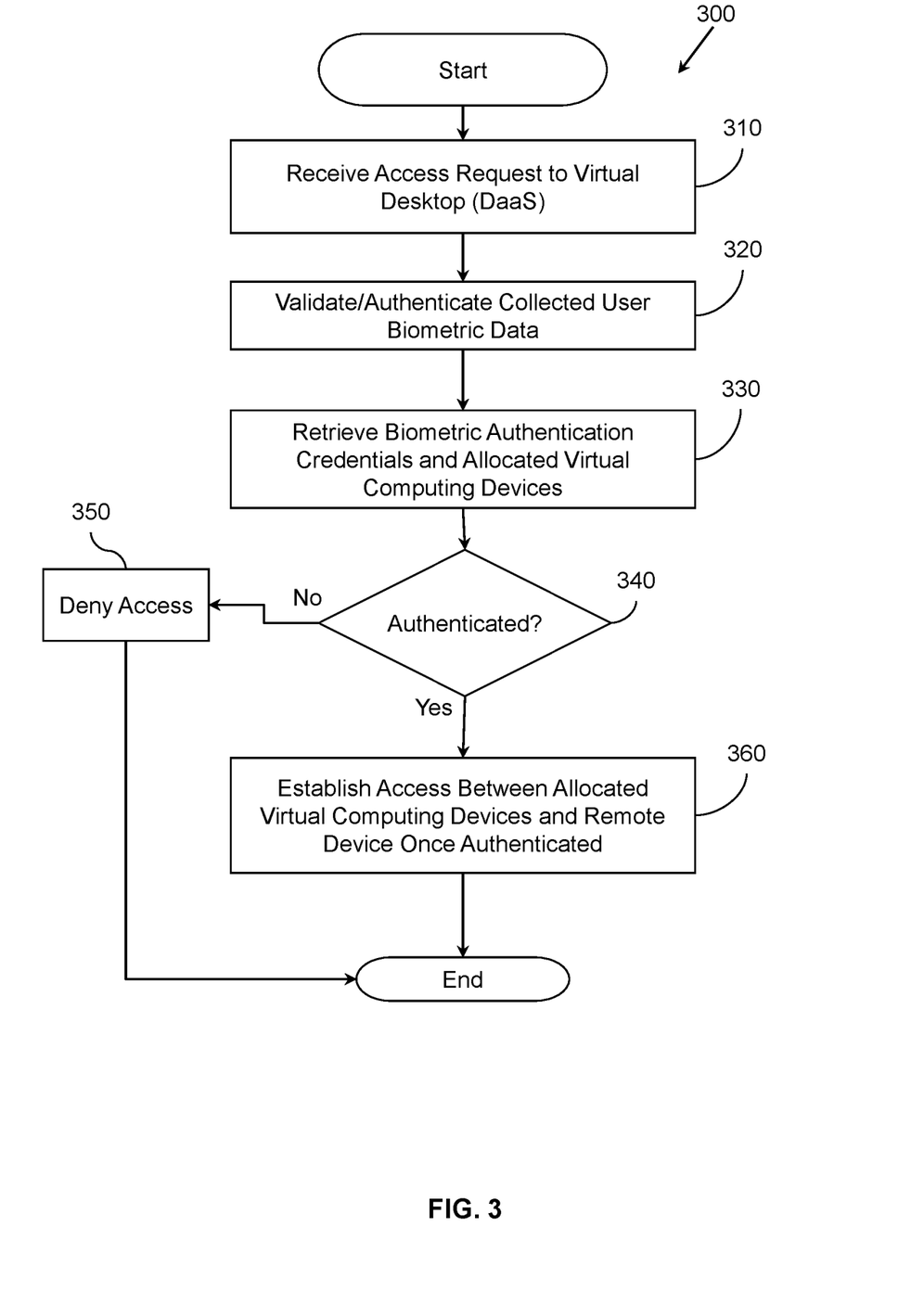
FIG. 3 illustrates one embodiment of a method associated with controlling an access request to a virtual desktop.

With reference to FIG. 3, one embodiment of a method 300 is illustrated that is associated with controlling access to a virtual desktop when an access request is requested from a remote device.

For example, a user wishes to access their virtual desktop (including provisioned virtual computing devices) from a remote device and submits an access request to the master server 105. In one embodiment, the remote device includes an access application (e.g., client-side application) that is configured to communicate with master server 105. The access application may prompt the user to input their biometric data as access credentials. Biometric input devices that are available on the user's remote device are used to scan and collect biometric data from the user, as previously described. In one embodiment, the access credentials may include other data in addition to the biometric data.

In one embodiment, the access request is generated to include at least content/parameters that identify the collected biometric data from the user. As previously stated, the collected biometric data may be converted into digital biometric data that represents unique numerical data points of the collected data. The conversion may be performed by the access application or may be performed by the master server 105 after receiving the access request. In another embodiment, the access request may also include other content/parameters, for example, parameters that identify the DaaS and/or virtual desktop being accessed.

In yet another embodiment, the access application (or user profile) may also be linked or associated with a specific DaaS or virtual desktop. As such, the access request may not include content/parameters that specifically identify the DaaS or virtual desktop. Rather, the DaaS or virtual desktop being requested may be identified by a server-side identify component when the access request is received based on the known association of the access application (or user profile) to the system and/or the user's DaaS or virtual desktop. For example, the server-side component may be the master server or other identity management component such as Oracle Identity and Access Management service (IAM) or similar function.

At block 310, the access request is received by the master server 105 that controls access to the DaaS and virtual desktops within the domain of the master server 105. The parameters/content of the access request are analyzed to identify the DaaS and/or virtual desktop requested and to identify the collected biometric data (access credentials for the request). This may include parsing the content of the access request.

In the embodiment (stated previously) where the server-side identify component is used, the access request may not include content that specifically identifies the DaaS and/or virtual desktop being requested. Thus, analyzing the access request to identify the DaaS and/or virtual desktop includes identifying the DaaS and/or virtual desktop by the server-side identify component based on the known association in the system to what services the user belongs to or is associated with (rather than parsing the access request to identify the items).

At block 320, the master server may validate the collected user biometric data that is associated with the access request. Validation may include determining if the collected biometric data (e.g., digital biometric data) is legitimate biometric data, accurate, complete, and/or otherwise complies with defined requirements (which may vary based on system implementations). In one embodiment, being legitimate data may include being in a recognized or expected format of biometric data. The biometric data from the access request should be in the same format as the registered biometric data that is stored in the biometric data repository and associated with the virtual desktops. If the collected biometric data is not recognized, not readable, incomplete, or not present (not provided with access request), the collected biometric data is determined to be invalid.

In response to invalid data, the master server 105 may reject the access request and/or prompt the user to repeat inputting their biometric data by returning an error reply to the access application. The access application (on the remote device) receives the error reply and prompts the user to reinput biometric data. Once collected, the collected biometric data is then transmitted to the master server 105 to repeat validation. In one embodiment, while prompting the user for their biometric data, the master server may initiate to access the corresponding virtual computing devices that are allocated to the virtual desktop identified in the access request. This may be performed to increase response time in case the access request is ultimately granted.

At block 330, after validation, the master server authenticates whether the collected biometric data (access credentials from the access request) matches the registered biometric data assigned to the virtual desk/DaaS from the registered user. In one embodiment, the master server queries the biometric data repository and retrieves the registered biometric data that is associated with the virtual desk/DaaS corresponding to the access request.

The collected biometric data is then compared to the retrieved registered biometric data to determine if they match. This may include comparing biometric coordinates of each and determining whether the collected biometric data matches the registered biometric data or are similar enough within a defined threshold (e.g., matches 98% of biometric coordinates). A match result may be generated that indicates either a match (authentication successful) or a non-match (authentication fails).

At block 340, the master server determines whether the collected biometric data from the access request is authenticated based on the match results of the comparison. If the collected biometric data from the access request does not match and fails authentication, the process moves to block 350 and the access request is denied. The master server prohibits access to the virtual desk and may return a rejection message to the access application of the remote device.

If the collected biometric data from the access request does match and is authenticated, the user requesting access is determined to be the registered user associated with the virtual desktop. The process moves to block 360. At block 360, in response to the collected biometric data being authenticated, the master server grants access. In one embodiment, the master server establishes remote access between the remote device and the virtual computing devices of the DaaS virtual desktop. The master server may establish access by coordinating with other network and system components to facilitate a communication channel(s) between the remote device and the provisioned virtual computing devices of the virtual desktop.

In one embodiment, after the communication channel is established, the remote device may receive catalogs and/or other components associated with the virtual desktop. These components allow the remote device to build a user interface to the allocated virtual computing devices for presentation to the user. In some embodiments, user may connect the remote device (e.g., a smart computing device) to an external display monitor by a cable or Bluetooth network. Once connected, the user interface of the virtual desktop may be extended to the external monitor and presented.

In this manner, the present control system and method allows a user to remotely access a virtual desktop from any device or location by providing their biometric data (e.g., one or more biometric features).

In some embodiments, the collected user biometric data may be configured with an expiration, after which the data is no longer valid. For example, collected biometric data is only valid for a defined validity time period, such as 24 hours after collected. In one embodiment, the collected user biometric data (associated with an access request) is setup or established at a certain point in time (e.g., the date/time the data is collected), and then torn down at some later point. The validity of the collected biometric data (at block 320, FIG. 3) may include checking whether the data has not expired based on the defined validity time period. For example, if the biometric data is collected at a first date/time, the master server may expire the validity when there is no user activity detected with the virtual desktop or master server from the remote client computing device. The established connection may then be disconnected. The access application on the remote device may then prompt the user to reinput their biometric information when the user attempts to access the virtual computing devices after certain period of time of inactivity.

Cloud or Enterprise Embodiments

In one embodiment, the control system 100 is a computing/data processing system including an application or collection of distributed applications for enterprise organizations. The applications and control system 100 may be configured to operate with or be implemented as a cloud-based networking system, a software as a service (SaaS) architecture, or other type of networked computing solution. In one embodiment the control system 100 is a centralized server-side application that provides at least the functions disclosed herein and that is accessed by many users via remote computing devices/terminals communicating with the computing system 100 (functioning as the server) over a computer network.

Cloud-hosted virtual desktops can be implemented using both virtual desktop infrastructure (VDI) and remote desktop services-based systems and can be provided through a public cloud, a private cloud infrastructure, and hybrid cloud platforms. Private cloud implementations are sometimes referred to as managed VDI. Public cloud offerings are sometimes based on desktop-as-a-service (DaaS) technology. The present systems and methods may be implemented with VDI, DaaS, or SaaS. Any one or combinations of these implementations are considered to fall within the definition of a virtual desktop as used herein.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 4:
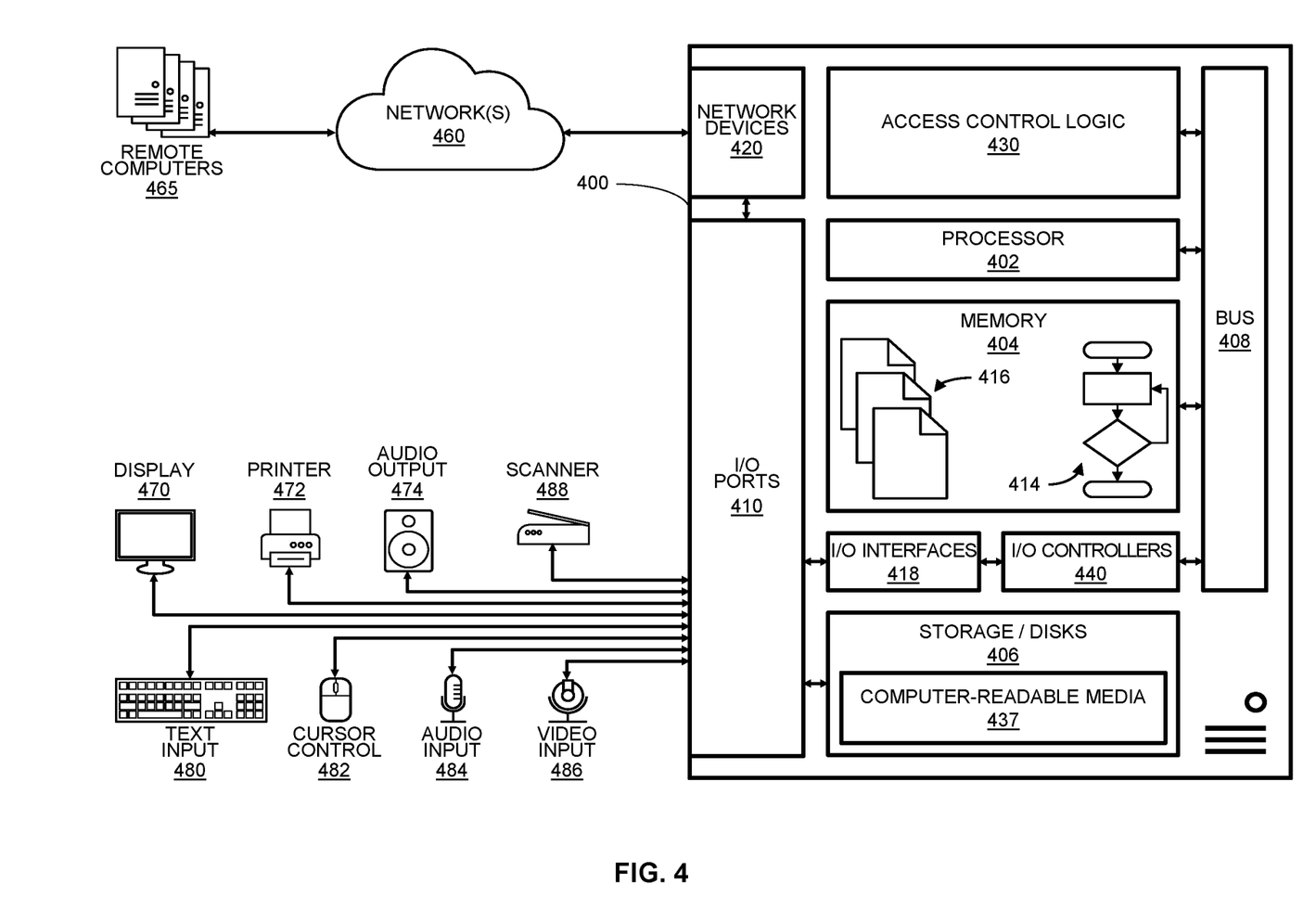
FIG. 4 illustrates an embodiment of a computing system configured with the example systems and/or methods disclosed.

FIG. 4 illustrates an example computing device that is configured and/or programmed as a special purpose computing device with one or more of the example systems and methods described herein, and/or equivalents. The example computing device may be a computer 400 that includes at least one hardware processor 402, a memory 404, and input/output ports 410 operably connected by a bus 408. In one example, the computer 400 may include access control logic 430 configured to facilitate and control access to virtual computing devices for a user based on biometric authentication similar to system 100, master server 105, and/or methods 200, 300 shown in FIGS. 1, 2, and 3.

In different examples, the logic 430 may be implemented in hardware, a non-transitory computer-readable medium 437 with stored instructions, firmware, and/or combinations thereof. While the logic 430 is illustrated as a hardware component attached to the bus 408, it is to be appreciated that in other embodiments, the logic 430 could be implemented in the processor 402, stored in memory 404, or stored in disk 406.

In one embodiment, logic 430 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate and control access to virtual computing devices for a user based on biometric authentication. The means may also be implemented as stored computer executable instructions that are presented to computer 400 as data 416 that are temporarily stored in memory 404 and then executed by processor 402.

Logic 430 may also provide means (e.g., hardware, non-transitory computer-readable medium that stores executable instructions, firmware) for performing access control to virtual computing devices for a user based on biometric authentication as described herein.

Generally describing an example configuration of the computer 400, the processor 402 may be a variety of various processors including dual microprocessor and other multi-processor architectures. A memory 404 may include volatile memory and/or non-volatile memory. Non-volatile memory may include, for example, ROM, PROM, and so on. Volatile memory may include, for example, RAM, SRAM, DRAM, and so on.

A storage disk 406 may be operably connected to the computer 400 via, for example, an input/output (I/O) interface (e.g., card, device) 418 and an input/output port 410 that are controlled by at least an input/output (I/O) controller 440. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The computer 400 may interact with, control, and/or be controlled by input/output (I/O) devices via the input/output (I/O) controller 440, the I/O interfaces 418, and the input/output ports 410. Input/output devices may include, for example, one or more displays 470, printers 472 (such as inkjet, laser, or 3D printers), audio output devices 474 (such as speakers or headphones), text input devices 480 (such as keyboards), cursor control devices 482 for pointing and selection inputs (such as mice, trackballs, touch screens, joysticks, pointing sticks, electronic styluses, electronic pen tablets), audio input devices 484 (such as microphones or external audio players), video input devices 486 (such as video and still cameras, or external video players), image scanners 488, video cards (not shown), disks 406, network devices 420, and so on. The input/output ports 410 may include, for example, serial ports, parallel ports, and USB ports.

The computer 400 can operate in a network environment and thus may be connected to the network devices 420 via the I/O interfaces 418, and/or the I/O ports 410. Through the network devices 420, the computer 400 may interact with a network 460. Through the network, the computer 400 may be logically connected to remote computers 465. Networks with which the computer 400 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. One or more non-transitory computer-readable media that include stored thereon computer-executable instructions that when executed by at least a processor of a computing system cause the computing system to:
    configure, by at least the processor, a desktop as a service (DaaS) for a registered user, wherein the DaaS includes at least allocated virtual computing devices and one or more operating systems installed on the allocated virtual computing devices;
    assign biometric access credentials to the DaaS for obtaining remote access to the DaaS, wherein the biometric access credentials are based at least in part on registered biometric data that was collected from and specific to the registered user;
    control access, by a server, to the DaaS based on biometric authentication, wherein the server is configured to:
        receive access requests from remote devices that request access to the DaaS;
        for a received access request from a remote device, analyze the received access request to identify the DaaS requested and to identify collected biometric data;
        validate the collected biometric data by determining that the collected biometric data is in a recognized format for the registered biometric data;
        in response to the collected biometric data being invalid, (1) reject the received access request, (2) prompt the registered user to reinput biometric data, and (3) initiate access to the virtual computing devices of the DaaS;
        authenticate whether the reinput biometric data matches the registered biometric data assigned to the DaaS from the registered user; and
        in response to the reinput biometric data being authenticated, establish remote access between the remote device and the virtual computing devices of the DaaS.

2. The non-transitory computer-readable media of claim 1, wherein the instructions to authenticate the reinput biometric data further comprise instructions that when executed by at least the processor cause the processor to:
    retrieve the registered biometric data that is assigned to the DaaS from a data repository, wherein the data repository associates previously registered biometric data with assigned accounts;
    compare the reinput biometric data from the received access request to the retrieved registered biometric data to determine a match result;

in response to the match result indicating a match, determine that the reinput biometric data is authentic and grant access to the allocated virtual computing devices; and in response to the match result indicating a non-match, reject the received access request.

3. The non-transitory computer-readable media of claim 1, wherein the instructions to configure the desktop as a service (DaaS) for the registered user further comprising instructions that when executed by at least the processor cause the computing system to:
create a virtual desktop that includes the allocated virtual computing devices associated with the DaaS;
wherein assigning the biometric access credentials to the DaaS includes assigning the registered biometric data to the virtual desktop; and
configure the virtual desktop to be accessed by biometric authentication based on an access request providing biometric data that matches the registered biometric data.

4. The non-transitory computer-readable media of claim 1, further comprising instructions that when executed by at least the processor cause the computing system to:
select an existing virtual desktop that is configured with non-biometric authentication credentials; and
reconfigure the existing virtual desktop with biometric-based authentication credentials to control access to the existing virtual desktop based upon biometric data.

5. The non-transitory computer-readable media of claim 1, further comprising instructions that when executed by at least the processor cause the computing system to:
generate the access request on the remote device by an access application configured to prompt for biometric data; and
collect the biometric data by a biometric input device associated with the remote device.

6. The non-transitory computer-readable media of claim 1,
wherein the DaaS is not restricted to be accessed from a specified remote device; and
wherein controlling access to the DaaS allows the access request to originate from any remote device.

7. The non-transitory computer-readable media of claim 1, wherein the instructions to validate the collected biometric data further configure the server to check that the collected biometric data has not expired.

8. The non-transitory computer-readable media of claim 1, wherein the instructions to assign biometric access credentials further cause the computing system to reconfigure existing non-biometric credentials for the DaaS with the registered biometric data.

9. A computing system, comprising:
at least one processor connected to at least one memory;
at least one network interface for communicating to one or more networks;
a non-transitory computer readable medium including instructions stored thereon that when executed by at least the processor cause the processor to:
configure, by at least the processor, a virtual desktop for a registered user, wherein the virtual desktop includes at least allocated virtual computing devices and is accessible by a desktop as a service (DaaS);
assign biometric access credentials to the virtual desktop for obtaining remote access to the virtual desktop, wherein the biometric access credentials are based at least in part on registered biometric data that was collected from and specific to the registered user;
control access to the virtual desktop by a server, where the server is configured to:
in response to collected biometric data not being in a recognized format of the registered biometric data, (1) prompt the registered user to reinput biometric data, and (2) initiate access to the allocated virtual computing devices of the DaaS;
establish remote access, via the at least one network interface, between a remote device and the allocated virtual computing devices of the virtual desktop in response to an access request that includes collected the reinput biometric data that matches the registered biometric data assigned to the virtual desktop; and
prohibit access to the virtual desktop in response to the access request failing to match the registered biometric data assigned to the virtual desktop.

10. The computing system of claim 9, wherein the instructions to control access to the virtual desktop further comprise instructions that when executed by at least the server cause the server to:
authenticate the reinput biometric data from the access request by at least:
retrieving the registered biometric data that is assigned to the virtual desktop from a data repository, wherein the data repository associates previously registered biometric data with assigned virtual desktops;
comparing the reinput biometric data from the access request to the retrieved registered biometric data to determine a match result;
in response to the match result indicating a match, determine that the reinput biometric data is authentic and grant access to the allocated virtual computing devices including establish the remote access; and
in response to the match result indicating a non-match, reject the access request and prohibit access to the virtual desktop.

11. The computing system of claim 9, wherein the instructions to control access to the virtual desktop further include instructions that when executed by at least the server cause the server to:
analyze access requests received from a plurality of remote devices that request access to a plurality of virtual desktops;
for the access request received from the remote device, identify the virtual desktop requested and identify the collected biometric data that was provided by the registered user via the remote device; and
authenticate whether the collected biometric data matches the registered biometric data assigned to the virtual desktop from the registered user.

12. The computing system of claim 9, wherein the instructions to configure the virtual desktop for the registered user further comprising instructions that when executed by at least the processor cause the processor to:
create the virtual desktop that includes the allocated virtual computing devices;
wherein assigning the biometric access credentials to the virtual desktop includes assigning the registered biometric data to the virtual desktop; and
configure the virtual desktop to be accessed by biometric authentication based on an access request providing biometric data that matches the registered biometric data.

13. The computing system of claim 9, further comprising instructions that when executed by at least the processor cause the processor to:
  select an existing virtual desktop that is configured with non-biometric authentication credentials; and
  reconfigure the existing virtual desktop with biometric-based authentication credentials to control access to the existing virtual desktop based upon biometric data.

14. The computing system of claim 9, further comprising instructions that when executed by at least the processor cause the processor to:
  generate the access request on the remote device by an access application configured to prompt for biometric data; and
  collect the biometric data by a biometric input device associated with the remote device.

15. The computing system of claim 9, wherein: the server is configured to control access to the virtual desktop based on biometric authentication of the collected biometric data that is received with the access request.

16. A computer-implemented method, the method comprising:
  configuring a virtual desktop for a registered user, wherein the virtual desktop includes at least allocated virtual computing devices and is accessible by a desktop as a service (DaaS);
  assigning biometric access credentials to the virtual desktop for obtaining remote access to the virtual desktop, wherein the biometric access credentials are based at least in part on registered biometric data that was collected from and specific to the registered user;
  controlling access to the virtual desktop, by a server, with biometric authentication comprising:
    in response to collected biometric data being in an unrecognized format for the registered biometric data, (1) prompt the registered user to reinput biometric data, and (2) initiate access to the allocated virtual computing devices of the DaaS;
    establishing remote access between a remote device and the allocated virtual computing devices of the virtual desktop in response to an access request that includes the reinput biometric data that matches the registered biometric data assigned to the virtual desktop; and
    prohibiting access to the virtual desktop in response to the access request failing to match the registered biometric data assigned to the virtual desktop.

17. The method of claim 16, wherein controlling access to the virtual desktop with biometric authentication further comprises, in response to receiving the access request:
  retrieving the registered biometric data that is assigned to the virtual desktop from a biometric data repository, wherein the biometric data repository associates previously registered biometric data with assigned virtual desktops;
  comparing the reinput biometric data from the access request to the retrieved registered biometric data to determine a match result;
  in response to the match result indicating a match, determine that the reinput biometric data is authentic and grant access to the allocated virtual computing devices; and
  in response to the match result indicating a non-match, reject the access request.

18. The method of claim 16, wherein configuring the virtual desktop for the registered user further comprises:
  creating the virtual desktop that includes the allocated virtual computing devices;
  wherein assigning the biometric access credentials to the virtual desktop includes assigning the registered biometric data to the virtual desktop; and
  configuring the virtual desktop to be accessed by biometric authentication based on an access request including the reinput biometric data that matches the registered biometric data.

19. The method of claim 16, further comprising:
  selecting an existing virtual desktop that is configured with non-biometric authentication credentials; and
  reconfiguring the existing virtual desktop with biometric-based authentication credentials to control access to the existing virtual desktop based upon biometric data.

20. The method of claim 16, wherein controlling access to the virtual desktop, by the server, with biometric authentication allows the access request to originate from any remote device.

* * * * *

UNITED STATES PATENT AND TRADEMARK OFFICE
CERTIFICATE OF CORRECTION

PATENT NO. : 12,164,614 B2
APPLICATION NO. : 17/730447
DATED : December 10, 2024
INVENTOR(S) : Manuel-Devadoss Page 1 of 1

It is certified that error appears in the above-identified patent and that said Letters Patent is hereby corrected as shown below:

In the Claims

In Column 14, Line 15, in Claim 9, delete "includes collected" and insert -- includes --, therefor.

Signed and Sealed this
First Day of April, 2025

Coke Morgan Stewart
*Acting Director of the United States Patent and Trademark Office*